3,200,077
FLUOROALKYL BENZOATE DIELECTRIC COMPOSITIONS

Werner Victor Cohen, Glen Farms, Md., assignor to E. I. du Pont de Nemours and Company, Wilmington, Del., a corporation of Delaware
No Drawing. Original application Oct. 16, 1959, Ser. No. 846,783, now Patent 3,108,131. Divided and this application Nov. 24, 1961, Ser. No. 154,849
2 Claims. (Cl. 252—65)

This application is a divisional application of copending application Serial No. 846,783, filed October 16, 1959, now Patent No. 3,108,131.

This invention is directed to dielectric materials and to compositions containing said materials. More particularly, the present invention relates to polyfluoroalkyl esters of certain o-substituted benzoic acids having a high dielectric constant and other properites that well adapt them for use as dielectrics. The new and useful dielectrics of the invention are represented by the formula

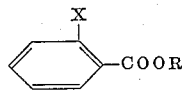—COOR where X is bromine, chlorine, fluorine, acetyl, propionyl, or benzoyl, and R is a polyfluoroalkyl group having the formula —$CH_2(CF_2)_nY$ where Y is hydrogen or fluorine and $n$ is an integer 1 to 5. These compounds have an unexpectedly high dielectric constant, good thermal stability, and low vapor pressure and are valuable for use as dielectric media by themselves, as components of compositions of mixed synthetic dielectric materials, and as impregnants in liquid impregnated paper dielectric compositions in electrical equipment.

In designing and developing electrical equipment such as capacitors, cables, electronic devices, rotating machinery, switchgear, transformers and the like, there is a significant need for dielectrics with higher dielectric constants and other improved properties than those possessed by materials already in use. Dielectrics are needed, for example, to store electrical energy in capacitors, to sustain high voltages in cables, to insulate one conducting element from another in electronic devices and in rotating machinery, to interrupt the arc in switchgear, and to cool transformers. The requirements for such dielectrics are, among other things, high resistance to the flow of electric currents, high stability to atmospheric conditions at ordinary and at somewhat elevated temperatures, high resistance to thermal decomposition, low vapor pressure, low pour point, low inflammability, and high flash point.

Mica is extensively used as a dielectric, although it cannot be used as an impregnant. As a capacitor dielectric mica has been satisfactory because of its high dielectric constant (7 to 8), its low power factor (about 0.1%), and the property of splitting into thin sheets of uniform thickness. Major disadvantages of mica are the limited size of individual sheets of the material, their high cost of preparation, and the relatively low voltage at which gas ionization leading to breakdown occurs in mica capacitors. Impregnation of mica capacitors is difficult owing to the imperviousness of mica.

Among the commonly used liquid dielectrics and dielectric impregnants are petroleum oil and chlorinated aromatic hydrocarbons. Petroleum oil is widely used as a dielectric particularly in transformers, switchgear, and capacitors, but petroleum oil has a relatively low dielectric constant (about 2), is a poor heat transfer agent, decomposes when subjected to electric discharge, and gradually forms tarry products and sludge deposits that adversely affect the electrical properties. Among the decomposition products are gases that present fire and explosion hazards. Highly chlorinated aromatic hydrocarbons as dielectrics offer several advantages over petroleum oil and have permitted marked electrical engineering advances to be made. This class of compounds has a dielectric constant (5 to 6 at 25° C.) over twice that of petroleum oil, is flameproof, does not give off flammable or explosive gases, and makes possible a large reduction in the size of capacitors. Such a size reduction results in a lower cost of the finished unit even though the synthetic dielectric may cost several times more than the petroleum oil it replaces. When a power distribution capacitor is reduced in size, for example, to one-half that of the older oil-impregnated unit, not only is half as much dielectric required but only about one-half as much paper, aluminum foil, steel for the container, etc. are needed. The reduced weight and decreased size of the capacitor provide obvious advantages in its storage, handling, and ultimate use. In transformers when the chlorinated aromatic hydrocarbons are subjected to arcing they give off hydrochloric acid gas which attacks the cellulosic insulation. The effect on cellulose, while partially corrected by the use of acid absorbing agents such as tin tetraphenyl, is a condition to be further corrected. The chlorinated aromatic hydrocarbons have high solvent power for most varnishes and some insulating materials so care must be taken in the selection of varnishes and other materials used in the chlorinated hydrocarbon-filled transformers and capacitors.

It is an object of the present invention to provide novel dielectric materials for the insulation of elements in electrical equipment wherein a medium having an unusually high dielectric constant is required. Another object is to provide a high dielectric for electrical equipment having a long useful life. A still further object of this invention is to provide a dielectric for capacitors that permits an economical and useful reduction in the size and weight of the units without sacrificing the construction and performance features that prolonged life and service require. These and other objects will become apparent in the following description and claims.

The heretofore described objects are attained with the novel dielectric materials and compositions of the present invention, that is, certain polyfluoroalkyl esters of benzoic acid having selected ortho-substituents. These new dielectrics have a dielectric constant in the range of 10 to 33; a resistance to thermal decomposition; no tendency to give off corrosive, or cellulose-degrading products; a low vapor pressure; and a high flash point. These dielectrics are particularly well adapted for use in capacitors in which a material with a high dielectric constant allows substantial reduction in the unit size of the equipment.

More specifically, the present invention is directed to a dielectric material represented by the formula

where X is bromine, chlorine, fluorine, acetyl, propionyl, or benzoyl which may be substituted with methyl, chlorine, bromine, or fluorine and R is a polyfluoroalkyl group having the formula —$CH_2(CF_2)_nY$ where Y is hydrogen or fluorine and $n$ is an integer 1 to 5, said dielectric having a dielectric constant of at least 10.

The present invention also encompasses dielectric compositions comprising (1) one or more of the heretofore described polyfluoroalkyl o-substituted benzoic acid esters and (2) a chlorinated aromatic hydrocarbon selected from the group consisting of a chlorinated monocyclic aromatic hydrocarbon and a chlorinated dicyclic aromatic hydrocarbon, said benzoic acid ester or esters constituting not less than 10% by weight of said dielectric composition.

The preferred dielectric materials of the present invention include 1H,1H,3H-tetrafluoropropyl o-acetylbenzoate,
1H,1H,5H-octafluoropentyl o-acetylbenzoate,
1H,1H,3H-tetrafluoropropyl o-benzylbenzoate, and,
1H,1H,3H-tetrafluoropropyl o-benzoylbenzoate, An additional preferred specie dielectric material includes 1H,1H-trifluoroethyl o-benzoylbenzoate. A dielectric composition comprising 1H,1H-3H-tetrafluoropropyl o-benzoylbenzoate and tetrachlorobiphenyl isomers, the benzoate part of this composition constituting not less than 10% by volume of said composition represents another preferred embodiment.

Representative ortho-substituted dielectric benzoic acid esters of the present invention are:

1H,1H,3H-tetrafluoropropyl o-acetylbenzoate
1H,1H-heptafluorobutyl o-acetylbenzoate
1H,1H,5H-octafluoropentyl o-acetylbenzoate
1H,1H-trifluoroethyl o-propionylbenzoate
1H,1H-nonafluoropentyl o-propionylbenzoate
1H,1H-trifluoroethyl o-benzoylbenzoate
1H,1H,3H-tetrafluoropropyl o-benzoylbenzoate
1H,1H,5H-octafluoropentyl o-benzoylbenzoate
1H,1H,3H-tetrafluoropropyl 2-m-toluoylbenzoate
1H,1H-heptafluorobutyl 2-p-toluoylbenzoate
1H,1H,3H-tetrafluoropropyl 2',4'-dichloro-2-benzoylbenzoate
1H,1H-nonafluoropentyl 4'-bromo-2-benzoylbenzoate
1H,1H-trifluoroethyl o-bromobenzoate
1H,1H,5H-octafluoropentyl o-bromobenzoate
1H,1H,3H-tetrafluoropropyl o-chlorobenzoate
1H,1H-heptafluorobutyl o-chlorobenzoate
1H,1H,3H-tetrafluoropropyl o-fluorobenzoate Preferred dielectric compounds are 1H,1H,3H-tetrafluoropropyl o-acetylbenzoate, 1H,1H,3H-tetrafluoropropyl o-benzoylbenzoate, 1H,1H,3H-tetrafluoropropyl o-chlorobenzoate, 1H,1H,5H-octafluoropentyl o-acetylbenzoate, and 1H,1H-trifluoroethyl o-benzoylbenzoate.

The polyfluoroalkyl o-acetyl-, o-propionyl-, and o-benzoylbenzoates of the present invention exist in two forms. One of these is the normal form having the structure

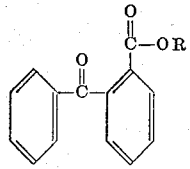

and the other is the pseudo form having the structure

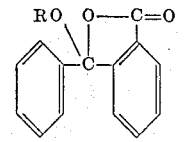

The two forms are distinguished by infrared spectroscopy. While the pseudo ester has a single carbonyl absorption peak at about 5.60$\mu$, the normal ester has two carbonyl peaks, one at about 5.78$\mu$ (carboxylic ester carbonyl) and the other at about 5.95$\mu$ (diaryl ketone carbonyl). Mixtures of the two ester forms show all three peaks.

Chlorinated aromatic hydrocarbons may be mixed with one or more of the dielectric benzoate esters of this invention to compose dielectric compositions and include benzene, toluene, alkyl ($C_2$ to $C_4$) benzenes, and biphenyl having 3 to 5 substituted chlorine atoms in the ring structure of the respective hydrocarbons, particularly the mixed isomers of these chlorinated compounds. Among the representative chlorinated hydrocarbons we may use are the isomers of the following:

Trichlorobenzene
Ethyltrichlorobenzene
Isopropyltrichlorobenzene
Ethyltetrachlorobenzene
Butyltetrachlorobenzene
Trichlorotoluene
Tetrachlorotoluene
Trichlorobiphenyl
Tetrachlorobiphenyl
Pentachlorobiphenyl
Mixed tri- and tetrachlorobiphenyls
Mixed tetra- and pentachlorobiphenyls
Mixed tetrachlorobiphenyl isomers and trichlorobenzene isomers and the like.

One may also mix, with the dielectric benzoate esters of this invention, ethylpentachlorobenzene, butylpentachlorobenzene, pentachlorotoluene and any specific isolated isomer of chlorinated benzene, toluene, or alkyl ($C_2$ to $C_4$) benzene having three or four chlorine atoms.

The ortho, acyl, aroyl, and halobenzoic acid esters are prepared by reacting the respective o-substituted benzoic acid with thionyl chloride or phosphorous pentachloride to form the benzoic acid chloride and then combing the acid chloride with a polyfluoroalkanol. The esters also may be prepared by esterifying the o-substituted benzoic acid with the polyfluoroalkanol with or without an acid catalyst. o-Benzoylbenzoic acid is available commercially and o-acetyl, o-bromo-, o-chloro-, and o-fluorobenzoic acid may be purchased from chemical suppliers. The preparation of o-propionylbenzoic acid is described in Beilstein, 10, 701; 10$^I$, 333.

The o-benzoylbenzoic acid chloride exists in the pseudo form

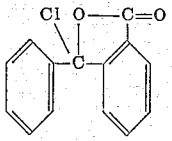

(Helvetica Chimica Acta, 42, 1085 (1959))

On reaction with an alcohol the pseudo form of the acid chloride tends to yield the pseudo form of the ester

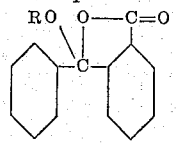

The pseudo ester is unstable in the presence of an excess of thionyl chloride and alcohol and in the presence of acid and becomes converted to the normal form. The presence of the pseudo isomer has a pronounced favorable effect on the dielectric constant as shown below.

To have the required electrical properties, the dielectric o-substituted benzoates of this invention must be purified to a high degree. A high purity is of utmost importance because ionic impurities and moisture lead to a loss of electrical energy in the form of heat when the compounds are used as dielectrics. Such an energy loss is measured by the power factor. The procedures used for purifying the subject benzoates include distillation, water washing to remove acidic and other ionic impurities, the use of ion exchange resins and eletrolytic techniques, and drying in absorption columns. The absorption columns may contain one or more of such moisture absorbents as silica gel, basic alumina, calcium hydride, sodium-calcium aluminosilicates.

The present novel dielectric benzoates or novel dielectric compositions containing them may be treated with small amounts of oxidation stabilizing agents; they may also be treated with acid or metal deactivating agents without impairing the usefulness of the compounds or compositions as dielectrics.

The dielectric benzoate esters of this invention having a high dielectric constant may be used as dielectrics by themselves or in dielectric compositions in many types of electrical equipment such as capacitors, cables, electronic equipment, rotating machinery, switchgear, transformers. One of the uses for which the new dielectrics are particularly well adapted is as a dielectric in capacitors. The high dielectric constant of these compounds makes possible a substantial reduction in the size and construction cost of a capacitor. The benzoate esters may also serve as an impregnant for high voltage cables, may be used as a filling compound for transformers and switchgear, and may be the impregnant in insulating compositions for electronic equipment and other electrical devices.

Representative examples illustrating the present invention follow.

EXAMPLE 1

*1H,1H,3H-tetrafluoropropyl o-acetylbenzoate as a dielectric*

A two-terminal unshielded electrical measuring cell was filled with 1H,1H,3H-tetrafluoropropyl o-acetylbenzoate and its capacitance measured by placing the cell in a constant temperature bath at 25° C. and connecting it to an electrical circuit comprising a capacitance bridge of the Schering type, an A.C. oscillator, a cathode ray oscilloscope, and a variable air condenser used as ballast capacitance. The assembled measuring cell had a volume of 7 ml., an over-all length of 7 in. and air capacitance of 24.2 $\mu\mu f$. It consisted of an outer Pyrex brand glass tube having a ground glass joint which supported an inner electrical assembly. This electrical assembly included four concentric nickel cylinders spaced 50 mils. apart and having outside dimensions of 21 mm. in length by 16 mm. in diameter. Alternate cylinders were connected by nickel prongs to form two electrodes. These were attached to leads extending through an inner glass tube having at the top the inner seal of the ground glass joint. The leads terminated as external connections. From the measurement of the capacitance of the cell empty (i.e., with air) and then filled with 1H,1H,3H-tetrafluoropropyl o-acetylbenzoate the dielectric constant of the benzoate was calculated using the equation $$\frac{C_k - C_e}{C_a} + 1 = E$$

where $C_k$=observed capacitance of cell containing material when measured at the terminals (includes the capacitance of the leads and a ballast capacitance of 100 $\mu\mu f$).

$C_e$=observed capacitance of cell containing air when measured as $C_k$ was measured=126 $\mu\mu f$.

$C_a$=capacitance of cell containing air minus ballast capacitance and capacitance of leads=24.2 $\mu\mu f$.

At 28° C. and at 200 to 1000 cycles the capacitance of the cell containing 1H,1H,3H-tetrafluoropropyl o-acetylbenzoate was 894 $\mu\mu f$., which corresponds to a dielectric constant of 32.8.

EXAMPLE 2

*Electrical properties of polyfluoroalkyl o-substituted benzoates*

The dielectric constant of representative polyfluoroalkyl esters of the o-substituted benzoic acids of the invention at 8000 cycles and 25° C. as determined by the procedure of Example 1 is given in the following table. Although some of the esters have a melting point above 25° C., they tend to exist at 25° C. as supercooled liquids and were measured as such.

| Ortho-substituent (X) | Ester radical (R) | Dielectric constant |
|---|---|---|
| Acetyl | 1H,1H,3H-tetrafluoropropyl, predominantly the pseudo form. | 32.8 |
| Benzoyl | 1H,1H-trifluoroethyl, pseudo form | 21.7 |
| | 1H,1H,3H-tetrafluoropropyl, normal form. | 18.1 |
| | Mixture of normal and pseudo forms | 23.5 |
| | 1H,1H,5H-octafluoropentyl, normal form. | 13.8 |
| Chlorine | 1H,1H,3H-tetrafluoropropyl | 13.8 |
| Fluorine | ----do---- | 15.9 |

The dielectric constant at 8000 cycles of a sample of 1H,1H,3H-tetrafluoropropyl o-benzoylbenzoate as a mixture of the normal and pseudo forms varied with the temperature as follows.

| Temperature, ° C.: | Dielectric constant |
|---|---|
| 25 | 24.0 |
| 45 | 23.3 |
| 75 | 20.5 |
| 100 | 18.0 |

EXAMPLE 3

When 1H,1H,3H-tetrafluoropropyl o-benzoylbenzoate is mixed with isomers of tetrachlorobiphenyl (a commercial product sold by the Monsanto Chemical Company under the trade name "Aroclor" 1242) to provide a dielectric composition having a lower pour point and a greater fluidity than the ester alone and a higher dielectric constant than the chlorinated biphenyl, the dielectric constant of the mixture varies with its composition as shown in the following table.

| 1H,1H,3H-tetrafluoropropyl o-benzoylbenzoate, parts by volume | Tetrachlorobiphenyl isomers, parts by volume | Dielectric constant at 25° C. and 8000 cycles |
|---|---|---|
| 100 | 0 | 18.1 |
| 50 | 50 | 11.1 |
| 25 | 75 | 8.2 |
| 0 | 100 | 5.8 |

Other properties of these mixtures are tabulated below.

Properties of mixtures of 1H,1H,3H-tetrafluoropropyl o-benzoylbenzoate (A) and tetrachlorobiphenyl isomers (B).

| Composition, percent by volume | 100A | 50A / 50B | 25A / 75B | 100B |
|---|---|---|---|---|
| Dielectric strength, kvolt/100 mil | 28 | | | 36 |
| Viscosity, in centistokes, ° F.: | | | | |
| 210 | 13.8 | 3.68 | 2.88 | 2.37 |
| 100 | 1,588 | 50.7 | 28.2 | 18.1 |
| 32 | | 9,040 | 3,300 | 1,500 |
| ASTM slope | 1.122 | 1.098 | 1.094 | 1.094 |
| Pour point, ° F. (ASTM D-97) | 35 | 15 | 5 | 5 |
| Flash point, ° F. (ASTM D-92) | 420 | 400 | 390 | 370 |

Similarly a mixture of 1H,1H-trifluoroethyl o-benzoylbenzoate and isomers of tetrachlorobiphenyl provides a dielectric composition having a dielectric constant that varies from the relatively low value of the tetrachlorobiphenyl isomers to the high value of the trifluoroethyl benzoate, for example,

| 1H,1H-trifluoroethyl o-benzoylbenzoate, parts by volume | Tetrachlorobiphenyl isomers, Parts by volume | Dielectric constant at 25° C. and 8000 cycles |
|---|---|---|
| 100 | 0 | 21.7 |
| 75 | 25 | 17.0 |
| 50 | 50 | 12.5 |
| 25 | 75 | 9.0 |
| 0 | 100 | 5.8 |

EXAMPLE 4

A capacitor (shown in Dielectric Materials and Applications, A. R. Von Hippel, editor, The Technology Press of M.I.T. and John Wiley and Sons, p. 198), is made up of sections composed of alternate layers of aluminum foil separated by sheets of special kraft cellulose paper. A section is constructed by winding the metal foil and paper on a mandrel, removing the assembly, and pressing it into a flat oval shape. The section so formed is placed with a multiple number of similar sections within an insulating box and the whole assembly inserted in a metal case. Connections to the foils are made by inserting thin metal strips at the upper ends of the capacitor sections. Then the sections are connected in various series or parallel combinations by soldered flexible leads. Next, the capacitor is placed in a vacuum oven for several days to remove air and moisture and then completely impregnated with purified 1H,1H,3H-tetrafluoropropyl o-acetylbenzoate while vacuum is maintained. Finally the capacitor case is sealed. The resultant capacitor has an exceptionally high capacitance.

Similarly the capacitor may be impregnated with a dielectric composition consisting of 50% of 1H,1H,3H-tetrafluoropropyl o-benzoylbenzoate and 50% of an isomeric mixture of tetrachlorobiphenyl to attain high capacitance.

The following examples (a) through (g) describe the preparation and analysis of representative specie benzoates of the present invention.

(a) PREPARATION OF 1H,1H,3H-TETRAFLUOROPROPYL o-BENZOYLBENZOATE

To 452 g. (2 moles) of o-benzoylbenzoic acid in a 2-l. round bottom flask was added dropwise 290 ml. (4 moles) of thionyl chloride with constant agitation and with the temperature of the reaction mixture kept between 15° and 20° C. The mixture was then heated to 40° C. for two hours and stirred at room temperature overnight. The excess thionyl chloride was removed by distillation at 45° C. and 7 mm. mercury pressure. The resultant o-benzoylbenzoyl chloride was cooled to room temperature and to it was added dropwise 350 g. (2.62 moles) of 1H,1H,3H-tetrafluoro-1-propanol. The temperature of the mixture was held at 40° C. for four hours and then increased to 100° C. for three hours. The hydrogen chloride gas liberated during the esterification as well as during the formation of the o-benzoylbenzoyl chloride was neutralized in a caustic scrubber. Distillation gave 589 g. of a yellow-colored 1H,1H,3H-tetrafluoropropyl o-benzoylbenzoate collected between 147 and 152° C. at 0.12 mm. pressure. Passage of a benzene solution of the colored distillate through a column of a magnesia-silica gel adsorbent removed the color. The benzene was distilled off and a distillation of the ester provided a colorless product having $n_D^{20}=1.5295$ and exhibiting in its infrared spectrum the characteristic carbonyl peaks for a normal ester at 5.73μ and 5.95μ. Very little of the 5.6μ peak appeared indicating the presence of only a trace of the pseudo form of the ester. Chemical analysis confirmed the identity of the product as 1H,1H,3H-tetrafluoropropyl o-benzoylbenzoate as follows—

Calculated for $C_{17}H_{12}O_3F_4$: C, 60.0%; H, 3.53%; F, 22.35%. Found: C, 59.8%; H, 3.7%; F, 22.3%.

(b) PREPARATION OF 1H,1H-TRIFLUOROETHYL o-BENZOYLBENZOATE

To 452 g. (2 moles) of o-benzoylbenzoic acid recrystallized from xylene and having a melting point of 130° C. contained in a 2-l. round bottom flask equipped with a stirrer, dropping funnel, reflux condenser, and drying tube was added dropwise 175 ml. (2.4 moles) of colorless thionyl chloride. During the addition of the thionyl chloride the mixture was agitated and its temperature kept between 30° and 40° C. The colorless thionyl chloride was prepared by the method of Fisher (Experiments in Organic Chemistry, 2nd ed., p. 381, 1949) employing boiled linseed oil. The mixture was stirred at room temperature overnight and the excess thionyl chloride and hydrogen chloride removed at 45° C. and a pressure of 7 mm. On cooling the residual o-benzoylbenzoyl chloride to room temperature 200 g. (2 moles) of 1H,1H-trifluoroethanol was added dropwise. The reaction was stirred at 40° C. overnight and then at 100° C. for three hours. By distillation a colorless liquid amounting to 414 g. was collected at 165° C. and 0.4 mm. pressure and identified as 1H,1H-trifluoroethyl o-benzoylbenzoate. The ester had $n_D^{20}=1.5300$, exhibited only one carbonyl peak in its infrared spectrum and that at 5.6μ, characteristic of the pseudo form of the ester, and gave the confirmatory chemical analysis—

Calculated for $C_{16}H_{11}O_3F_3$: C, 62.3%; H, 3.57%; F, 18.5%. Found: C, 62.6%; H, 3.8%; F, 18.3%.

(c) PREPARATION OF 1H,1H,5H-OCTAFLUOROPENTYL o-BENZOYLBENZOATE

To a 2-l. round bottom flask equipped with thermometer, stirrer, and reflux condenser with a water cooled trap for separating water from heavier liquids was charged 226 g. (1 mole) of o-benzoylbenzoic acid, 928 g. (4 moles) of 1H,1H,5H-octafluoro-1-pentanol, and 1 ml. of concentrated sulfuric acid. The mixture was stirred and heated at about 140° C. overnight. The water collected in the trap amounted to 17.5 ml. The reaction mass was cooled to room temperature, shaken with 1% aqueous sodium hydroxide solution and with water, separated, and distilled to remove the excess polyfluoroalcohol and a small amount of water. To the remaining organic liquid was added 10 g. of adsorbent charcoal and 8 g. of activated alumina, and the mixture was heated at 100 to 150° C. at 5 mm. pressure with nitrogen gas bubbling through the material for four hours. The hot mixture was filtered with suction, and the filtrate was distilled to yield 316 g. of a pale yellow liquid boiling at 151 to 154° at 0.13 mm. The product was 1H,1H,5H-octafluoropentyl o-benzoylbenzoate having $n_D^{20}=1.4930$, $d_4^{20}=1.449$, and a chemical analysis—

Calculated for $C_{19}H_{12}F_8O_3$: C, 51.85%; H, 2.75%; F, 34.50%. Found: C, 52.0%; H, 2.3%; F, 34.8%.

The melting point of material crystallized from 1,1,2-trichlorotrifluoroethane was 38° C.

(d) PREPARATION OF 1H,1H,3H-TETRAFLUOROPROPYL o-ACETYLBENZOATE

To 153 g. (0.74 mol) of phosphorus pentachloride contained in a 1-l. round bottom flask equipped with a reflux condenser was added over a period of one hour at 25° C. 121 g. (0.74 mole) of o-acetylbenzoic acid. When the reaction mixture became liquid, it was heated at 50° C. at 100 mm. pressure to remove phosphorus oxychloride. To the reactor was then added 195 g. (1.48 moles) of 1H,1H,3H-tetrafluoro-1-propanol and 2 g. of absorbent charcoal, and the reaction mixture was heated at 45° C. overnight and at 100° to 108° C. for four hours. The mixture was cooled to room temperature, filtered, and diluted with 300 ml. of ether. The ether solution was washed with an aqueous buffer solution at pH 8. The lower ether layer was separated, dried over anhydrous magnesium sulphate, and distilled. At first the ether was removed, then the excess polyfluoropropanol, and at 98° to 103° C. and 0.04 mm. pressure was obtained 1H,1H,3H-tetrafluoropropyl o-acetylbenzoate having $$n^D{}_{20}=1.4695$$

and predominately the pseudo form of the ester as indicated by the infrared spectrum. The confirmatory chemical analysis is—

Calculated for $C_{12}H_{10}O_3F_4$: C, 51.8%; H, 3.96%; F, 27.3%. Found: C, 52.0%; H, 3.6%; F, 27.2%.

(e) PREPARATION OF 1H,1H,3H-TETRAFLUOROPROPYL o-CHLOROBENZOATE

To 156 g. (1 mole) of recrystallized o-chlorobenzoic acid in a 2-l. round bottom flask was added dropwise at room temperature 238 g. (2 moles) of thionyl chloride. The reaction mixture was heated at 60° C. for four hours, the liberated hydrogen chloride gas being neutralized in a caustic scrubber. The excess thionyl chloride was removed by distillation at 45° C. at 7 mm. pressure. The resultant o-chlorobenzoyl chloride was cooled to room temperature and to it was added dropwise 264 g. (2 moles) of 1H,1H,3H-tetrafluoro-1-propanol. The mixture was heated at 180° C. overnight, the evolved hydrogen chloride being neutralized in a caustic scrubber as above. The unrefined product was washed once with a 5% aqueous solution of sodium bicarbonate and three times with distilled water. After drying, the product was distilled at 82 to 85° C. at 0.5 mm. to yield 144 g. of 1H,1H,3H - tetrafluoropropyl o - chlorobenzoate having $n_D^{20}=1.4700$ and a chemical analysis—

Calculated for $C_{10}H_7O_2ClF_4$: C, 44.4%; H, 2.6%; F, 28.1%. Found: C, 44.1%; H, 2.6%; F, 27.9%.

(f) PREPARATION OF 1H,1H,3H-TETRAFLUOROPROPYL o-FLUOROBENZOATE

By the procedure described above for the preparation of 1H,1H,3H-tetrafluoropropyl o-chlorobenzoate 100 g. of o-fluorobenzoic acid was reacted with 124 ml. of thionyl chloride, the excess thionyl chloride removed by distillation, and the resulting o-fluorobenzoyl chloride esterified with 200 g. of 1H,1H,3H-tetrafluoro-1-propanol to yield 77 g. of 1H,1H,3H-tetrafluoropropyl o-fluorobenzoate. The product had a boiling point of 70° C. at 0.06 mm. and a chemical analysis—

Calculated for $C_{16}H_7O_2F_5$: C, 47.3%; H, 2.8%; F, 37.4%. Found: C, 47.3%; H, 3.0%; F, 37.8%.

As many apparently widely different embodiments of this invention may be made without departing from the spirit and scope thereof, it is to be understood that this invention is not limited to the specific embodiments thereof except as defined in the appended claims.

I claim:
1. A dielectric composition consisting essentially of (1) a dielectric material represented by the formula

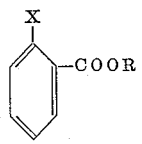

wherein X is selected from the group consisting of bromine, chlorine, fluorine, acetyl, propionyl, and benzoyl substituents, said benzoyl substituent being selected from the group consisting of benzoyl and benzoyl substituted with a substituent selected from the group consisting of methyl, chlorine, bromine and fluorine; R is a polyfluoroalkyl group having the formula $-CH_2(CF_2)_nY$ wherein Y is selected from the group consisting of hydrogen and fluorine and $n$ is an integer within the range of 1 to 5, said dielectric material having a dielectric constant of at least 10, and, (2) a chlorinated aromatic hydrocarbon selected from the group consisting of a chlorinated monocyclic aromatic hydrocarbon and a chlorinated dicyclic aromatic hydrocarbon, said chlorinated aromatic hydrocarbon having 3 to 5 substituent chlorine atoms in the respective ring structures, said benzoate ester component constituting not less than 10% and up to 75% by weight of said composition.

2. A dielectric composition consisting essentially of 1H,1H,3H-tetrafluoropropyl o-benzoylbenzoate and tetrachlorobiphenylisomers, said benzoate component constituting not less than 10% by volume of said composition.

References Cited by the Examiner
UNITED STATES PATENTS
2,921,957    1/60    O'Rear _____ 252—65

OTHER REFERENCES
Baer: Fluoro Alcohols, Ind. Eng. Chem., 51, 1959, page 829.

ALBERT T. MEYERS, *Primary Examiner.*

JOSEPH R. LIBERMAN, JULIUS GREENWALD, *Examiners.*